United States Patent [19]
Bett et al.

[11] Patent Number: 5,872,189
[45] Date of Patent: Feb. 16, 1999

[54] WATER-REDISPERSIBLE POWDERS OF FILM-FORMING POLYMERS WITH A "CORE/SHELL" STRUCTURE

[75] Inventors: Bill Bett, Paris; Joël Richard, Blou, both of France

[73] Assignee: Rhone-Poulenc Chimie, Courbevoie, France

[21] Appl. No.: 860,204

[22] PCT Filed: Dec. 20, 1995

[86] PCT No.: PCT/FR95/01699

§ 371 Date: Sep. 8, 1997

§ 102(e) Date: Sep. 8, 1997

[87] PCT Pub. No.: WO96/20963

PCT Pub. Date: Jul. 11, 1996

[30] Foreign Application Priority Data

Jan. 6, 1995 [FR] France ................................ 95 00086

[51] Int. Cl.$^6$ ....................... C08F 279/02; C09D 151/04; C09J 151/04
[52] U.S. Cl. ........................... 525/243; 525/244; 525/262
[58] Field of Search .................................... 525/301, 281, 525/285, 243, 244, 262

[56] References Cited

U.S. PATENT DOCUMENTS

| | | | |
|---|---|---|---|
| 4,876,313 | 10/1989 | Lorah | 525/281 |
| 4,937,280 | 6/1990 | Biglione. | |
| 5,403,894 | 4/1995 | Tsai et al. | 525/285 |
| 5,500,286 | 3/1996 | Someya et al. | 428/402.24 |

OTHER PUBLICATIONS

Honey Chemical Ind, Derwent AN 91–055066, abstracting JP 3006269, Jan. 1991.

*Primary Examiner*—Jeffrey C. Mullis

[57] ABSTRACT

The present invention relates to a water-redispersible powder based on film-forming polymers which are substantially water-insoluble and which are prepared by aqueous emulsion polymerization of monomers containing ethylenic unsaturation with a "core/shell" structure comprising a hydrophobic core based on a polymer exhibiting a Tg (glass transition temperature) of between −30° and +25° C., preferably between −10° and +20° C., and a hydrophilic shell based on a polymer exhibiting a Tg higher than +55° C., preferably higher than +90° C., characterized in that the shell is bonded to the core by covalent bonds resulting from the reaction of an agent for grafting the shell onto the ethylenic unsaturations remaining in the core, and is substantially insoluble in an alkaline medium.

17 Claims, No Drawings

WATER-REDISPERSIBLE POWDERS OF FILM-FORMING POLYMERS WITH A "CORE/SHELL" STRUCTURE

The present invention relates to water-redispersible powders of film-forming polymers with a "core/shell" structure.

More particularly, the film-forming polymers are prepared by aqueous emulsion polymerization of monomers containing ethylenic unsaturation.

Redispersible powders of the above type, which are generally obtained by spray-drying polymer latices, are already known. These powders have a great commercial advantage because they can be marketed as they are to the various users who redisperse them in water to prepare formulations which are suitable for the conventional uses of latices, namely especially the preparation of paper-coating compositions, paint compositions, adhesive coatings (pressure-sensitive adhesives, tiling adhesives) and additives to hydraulic binders of the mortar or concrete type.

It is understood that the sale of such powders which can be redispersed by the user into a pseudo- or neolatex has, when compared with the sale of the initial latex, the immense advantage of not comprising water, which generally constitutes at least 50% of the weight of the latex, and this entails considerable savings in transport and handling.

However, such powders must exhibit the following properties to be marketable:
 they must be stable in storage,
 they must be easily redispersible in water at ambient temperature and must produce a neolatex of narrow particle size which is suitable for the targeted application,
 for the application as additive to hydraulic binders, more particularly targeted in the case of the present invention, the additive resulting from the redispersible powder must be compatible with the hydraulic binder, must allow the hydraulic binder to set solid without delaying the setting process and must impart to the coatings, comprising the binder containing the additive, a correct adhesiveness to the usual substrates even in the moist state, as well as good mechanical properties.

The present invention proposes a redispersible powder exhibiting all of the desired properties indicated above in the conventional applications of latices and more particularly in coating compositions and compositions of additives for a hydraulic binder, in particular for Portland cement.

It relates, in fact, to a water-redispersible powder based on film-forming polymers which are substantially insoluble and which are prepared by aqueous emulsion polymerization of monomers containing ethylenic unsaturation and with a "core/shell" structure comprising a hydrophobic core based on a polymer exhibiting a Tg (glass transition temperature) of between $-30°$ and $+25°$ C., preferably between $-10°$ and $20°$ C., and a hydrophilic shell based on a polymer exhibiting a Tg higher than $55°$ C., preferably higher than $+90°$ C., characterized in that the shell is bonded to the core by covalent bonds resulting from the reaction of an agent for grafting the shell onto the ethylenic unsaturations remaining in the core, and is substantially insoluble in an alkaline medium.

The present invention also relates to a process for the preparation of a redispersible powder in accordance with the invention, and to the use of the said powder.

The powder according to the invention is composed of particles based on film-forming polymers which are water-insoluble, exhibiting a core/shell structure. These particles with a core/shell structure consist of a core made up of a hydrophobic and soft polymer, that is to say exhibiting a Tg of between $-30°$ and $+25°$ C., preferably between $-10°$ and $+20°$ C., which contains remaining ethylenic unsaturations, and of a core based on a hydrophilic, hard polymer exhibiting a Tg higher than $55°$ C., preferably higher than $90°$ C. The shell is bonded to the core by covalent bonds resulting from the reaction of an agent for grafting the shell onto the ethylenic unsaturations remaining in the core.

The glass transition temperature is determined by the differential thermal analysis method.

Such particles of substantially water-insoluble core/shell polymers are generally prepared from a polymer latex by a two-stage polymerization process such as, for example, that described in Patent U.S. Pat. No. 4,876,313, cited as reference, according to which, during a first stage, the core made up of a hydrophobic and soft polymer is prepared and, during a second stage, the shell made up of a hard and hydrophilic polymer is grafted onto the core.

The monomers employed for making the core are essentially chosen from styrene, butadiene and $C_1$–$C_{12}$ alkyl acrylates or methacrylates. These monomers, by themselves or mixed, constitute from 99.9 to 92% of the monomer mixture. The monomer mixture recommended according to the invention is the styrene/butadiene mixture. The more or less hydrophobic nature of the core may be generally adjusted by adding to the monomer mixture from 0.1 to 8% by weight of at least one carboxylic acid monomer containing ethylenic unsaturation, such as acrylic acid, methacrylic acid, itaconic acid, maleic acid or fumaric acid or of an unsaturated carboxylic acid ester monomer containing a hydroxyalkyl functional group, like hydroxyethyl acrylate and hydroxypropyl acrylate or a monomer containing an amide functional group chosen, for example, from methylolacrylamide, acrylamide, methacrylamide and methylmethacrylamide. The polymerization of the monomers is carried out in the presence of an emulsifier and of a polymerization initiator.

A person skilled in the art knows how to choose the respective quantities of "hard" monomers (for example styrene and methyl methacrylate) and of "soft" monomers (for example butadiene and butyl acrylate) with a view to obtaining a polymer which has the desired Tg of between $-30°$ and $+25°$ C.

The monomers used during this first stage may be introduced as a mixture or separately and simultaneously into the reaction mixture, or before the beginning of the polymerization, once only, or during the polymerization, using successive fractions or continuously.

The polymerization of the monomers forming the core is carried out in the presence of an emulsifier and of a polymerization initiator.

The emulsifying agent used is generally the conventional anionic agents represented especially by the alkali metal salts of fatty acids, alkyl sulphates, alkylsulphonates, alkylaryl sulphates, alkylarylsulphonates, aryl sulphates, arylsulphonates, sulphosuccinates and alkyl phosphates. They are employed in a proportion of 0.01 to 5% by weight relative to the total weight of the monomers.

The initiator for emulsion polymerization, which is water-soluble, is represented more particularly by hydroperoxides such as aqueous hydrogen peroxide, tert-butyl hydroperoxide, and by persulphates such as sodium persulphate, potassium persulphate and ammonium persulphate. It is employed in quantities of between 0.05 and 2% by weight relative to the total of the monomers. These initiators are optionally used in combination with a reducing agent such as sodium bisulphite or formaldehyde sulphoxylate, polyethyleneamines, sugars: dextrose, sucrose, or metal salts. The quantities of reducing agent which are employed vary from 0 to 3% by weight relative to the total weight of the monomers.

The reaction temperature, which is a function of the initiator used, is generally between 0° and 100° C. and preferably between 50° and 80° C.

A transfer agent may be employed in proportions ranging from 0 to 3% by weight relative to the monomer(s) and is generally chosen from mercaptans such as n-dodecyl mercaptan, tert-dodecyl mercaptan, cyclohexene and halogenated hydrocarbons such as chloroform, bromoform and carbon tetrachloride.

At the end of the first stage of preparation of the core, the second stage of preparation of the shell is begun by adding directly to the latex comprising the core particles a mixture of monomers which is suitable for producing a hard and hydrophilic shell which consists of a polymer exhibiting a Tg higher than 55° C., preferably higher than 90° C.

Furthermore, during the second stage an effective quantity of a grafting agent is added during the emulsion polymerization in order to bond the shell by covalent bonds to the ethylenic unsaturations remaining in the core, so as to graft the shell firmly onto the core.

From 40 to 95% by weight of the base monomers of the shell are chosen from styrene and a $C_1$–$C_{12}$ alkyl acrylate or methacrylate. The alkyl acrylate or methacrylate may be chosen, for example, from ethyl acrylate, butyl acrylate and 2-ethylhexyl acrylate. The hydrophilic nature of the shell and its property of insolubility in an alkaline medium (for example pH higher than or equal to 8) is adjusted by adding from 4.5 to 55% by weight of a monomer chosen from carboxylic acids containing ethylenic unsaturation, monomers containing an amide functional group and monomers containing a hydroxyalkyl functional group. These monomers which make it possible to adjust the hydrophilic nature of the shell may be the same ones as those employed for adjusting (that is to say decreasing) the hydrophobic nature of the core. The important point is that the shell must have a substantially higher hydrophilic nature than the core and must also be insoluble in an alkaline medium.

A person skilled in the art knows how to choose the respective quantities of "hard" monomers (for example styrene and methyl methacrylate) and of "soft" monomers (for example butadiene and butyl acrylate) with a view to obtaining a polymer which has the desired Tg higher than 55° C.

The polymerization mixture additionally contains a grafting agent in sufficient quantity and sufficiently reactive to produce covalent bonds between the shell and the ethylenic bonds present in the core.

This grafting agent consists of an organic compound containing at least two ethylenic unsaturations exhibiting different reactivities during emulsion polymerization reactions, the more reactive unsaturation reacting with the monomers with the result that the grafting agent forms an integral part of the polymer constituting the shell, the other unsaturation being insufficiently reactive to undergo polyaddition with the ethylenic unsaturations of the other monomers, but being sufficiently reactive to react with the remaining double bonds of the core to bind the shell to the core by covalent bonds.

An effective grafting agent which may be mentioned is the alkene and more particularly (meth)allyl esters of (meth) acrylic acid, such as allyl methacrylate, allyl acrylate, (meth) allyl esters of the mono- and diesters of maleic, fumaric and itaconic acids, and the alkene derivatives of the amides of acrylic and methacrylic acids, such as N-methallylmaleimide.

The grafting agent is added in a quantity which is generally between 0.2 and 4, preferably 0.5 to 3% by weight of the weight of the shell monomer.

As in the case of the core, the polymerization is performed in the presence of an emulsifier and of a polymerization initiator.

The polymerization initiator is preferably organophilic and exhibits a high affinity for the particles of polymer constituting the core so as to improve the grafting. It is generally a peroxide or a perester such as especially cumene hydroperoxide, dicumyl peroxide, tert-butyl perneodecanoate, tert-butyl per-3,5,5-trimethylhexanoate, bis(3,5,5-trimethylhexanoyl) peroxide, dioctanoyl peroxide, dilauroyl peroxide and dibenzoyl peroxide. It is more particularly recommended to employ the tert-butyl perbenzoate/ascorbic acid combination in a weight content of 0.5 to 5% by weight of the combination relative to the total weight of the monomers.

It should be noted that if a water-soluble initiator, such as ammonium persulphate, is employed instead of the organophilic initiator, a powder of mediocre redispersibility is obtained.

It is desirable to employ a transfer agent to adjust the molecular masses of the shell polymer. The same transfer agents may be employed as those mentioned above for preparing the core, as well as alkyl($C_1$–$C_{12}$) mercaptan alkanoates ($C_1$–$C_6$), such as methylmercapto propionate.

The emulsion polymerization of the shell is performed in conditions which are similar to those of the core.

The latex obtained generally has a particle size of between 0.1 and 0.3 μm.

The shell preferably constitutes from 50 to 5%, preferably from 30 to 10% by weight of the total core+shell weight.

The redispersible powder according to the invention may additionally include at least one inorganic filler which preferably has a particle size smaller than approximately 10 μm, preferably smaller than 3 μm.

It is recommended to employ as an inorganic filler a filler chosen especially from calcium carbonate, kaolin, barium sulphate, titanium oxide, talc, alumina hydrate, bentonite, silica and calcium sulphoaluminate (satin white).

The powder may include from 0.5 to 40, preferably from 2 to 20 parts by weight of the said filler per 100 parts by weight of film-forming polymers.

All or part of the filler may be replaced with at least one partially water-soluble saccharide which may be in particular glucose, fructose, galactose, dextrose, arabinose, sucrose, mannose, lactose and glycine. The saccharides employed preferably have a melting point higher than 100° C. and a solubility of between 50 and 500 g/l.

Lactose, galactose and mannose are the preferred saccharides, because they have a melting point higher than 100° C.

The redispersible powder may comprise from 0.5 to 30, preferably 5 to 20 parts by weight of saccharide per 100 parts of film-forming polymers.

This inorganic filler and/or saccharide may be added to the redispersible powder directly or during its preparation.

The present invention also relates to the process for the preparation of the redispersible powder according to the invention, which consists in:

removing the water from an aqueous emulsion consisting of the said film-forming polymers which are substantially water-insoluble and which are prepared by polymerization in an emulsion whose pH is adjusted between 5 and 8, and optionally including suitable quantities of inorganic filler and of saccharide, and pulverizing the dry residue obtained to a powder with the desired particle size.

The starting point is an aqueous emulsion of film-forming polymer which is water-insoluble, obtained by emulsion polymerization as defined above. This type of emulsion is commonly called a latex.

The other components of the pulverulent composition: saccharide and inorganic filler may be added to this aqueous emulsion. The respective contents of the various constituents are chosen so that the dried pulverulent compositions have the composition defined previously.

The water of this emulsion is subsequently removed and the product obtained is pulverized to obtain a powder. The stages of removal of the water from the latex emulsion and of obtaining a powder may be separate or combined. It is thus possible to employ a process of freezing, followed by a stage of sublimation or of freeze-drying, of drying or of drying by atomizing (spray-drying).

Drying by atomizing is the preferred process because it makes it possible to obtain directly the powder with the desired particle size without necessarily going through the grinding stage. The particle size of the powder is generally smaller than 500 μm, preferably smaller than 100 μm.

Drying by atomizing may be performed in the usual manner in any known apparatus such as, for example, an atomizing tower combining a pulverization produced by a nozzle or a turbine with a stream of hot gas.

The entry temperature of the hot gas (generally air) at the head of the column is preferably between 100° and 115° C. and the exit temperature is preferably between 55° and 65° C.

The inorganic filler and the saccharide may be added to the aqueous emulsion of starting polymer or else directly to the final pulverulent composition.

All or part of the inorganic filler is preferably introduced during the pulverization stage in the process of drying by atomizing (spray-drying).

The presence of these inorganic fillers in the emulsion promotes the preparation of the powder and its stability in storage, avoiding aggregation of the powder, that is to say its caking.

In most cases the powders according to the invention are completely redispersible in water at ambient temperature, merely by agitation. Completely redispersible is intended to mean a powder in accordance with the invention which, after the addition of a suitable quantity of water, makes it possible to obtain a pseudolatex whose particle size of the particles is substantially identical with the particle size of the latex particles present in the starting emulsion.

The powders obtained are stable in storage; they can be easily redispersed in water in the form of pseudolatex and employed directly in the form of powder or in the form of pseudolatex in all the known fields of application of latices.

They are suitable very particularly in the building industry as additives to the mixes of hydraulic mineral binder for the production of protective and decorative coatings and of adhesive mortars and adhesive cements intended for the laying of tiling and of floor coverings, where they are employed in a weight proportion of 1 to 10%, preferably of 2 to 5%. They are found to be particularly well suited to the preparation of ready-for-use powdered products based on cement and o n plaster.

The powders of the invention or the pseudo-latices derived therefrom are furthermore usable in all the other fields of application of latices, more particularly in the field of adhesives, of paper coating and of paints. The powders according to the invention may additionally comprise the usual additives, in particular biocides, microbiostats, bacteriostats and silicone and organic foam-suppressors.

In all that follows or that precedes, the parts and percentages are expressed by weight, unless shown otherwise.

EXAMPLES

Comparative Example 1

Preparation of the shell without grafting agent 3 kg of a carboxylated styrene/butadiene latex (C) with a solids content of 50%, prepared by emulsion polymerization of a mixture of 37% of butadiene, 59% of styrene and 4% of acrylic acid are diluted with 120 g of deionized water.

The diluted latex is heated with stirring to 75(±1)°C. in a glass reactor comprising a condenser and reactant feed tubes. Ammonium persulphate (2 g) dissolved in deionized water (20 g) is introduced into the reactor at 68(±1)°C.

A mixture of monomers consisting of styrene (114.6 g) and methacrylic acid (39 g) and a transfer agent which is mercaptomethyl propionate (MMP: 5.4 g) are next introduced into the reactor over 3 hours at a temperature maintained at 75(±1)°C.

In parallel, ammonium persulphate (2 g) dissolved in 19 g of deionized water is added to the reactor over 3 hours 30 minutes.

The final latex obtained is heated to 82(±1)°C. for 1 hour, cooled and discharged from the reactor.

Comparative Example 2

Preparation of the shell without initiator

The procedure of Example 1 is repeated exactly except that the monomer mixture added to the diluted latex additionally contains allyl methacrylate (1 g).

Comparative Example 3

Preparation of the shell without grafting agent

The starting point is the same diluted latex (C) according to the same quantities and in the same reactor as in Example 1.

The diluted latex is heated with stirring to 80(±1)°C.

Ammonium persulphate (2 g) dissolved in deionized water (20 g) is introduced into the reactor at 68(±1)°C.

20 g of a monomer mixture consisting of styrene (114.6 g) and methacrylic acid (39 g) and tert-butyl perbenzoate (3.0 g) in 20 g of deionized water are next introduced over 15 minutes at a temperature maintained at 75(±1)°C.

The remaining part of the above monomer mixture is then introduced into the reactor while its temperature is maintained at 80(±1)°C. In parallel, ascorbic acid (1.5 g) dissolved in 50 g of deionized water is added to the reactor over 3 hours 30 minutes. After introduction of the monomer mixture, the reaction mixture is heated for 1 hour to 85(±1) °C. It is cooled and discharged.

Example 4

Preparation of the shell in the presence of a grafting agent and of an initiator The procedure of Example 3 is repeated exactly except that the monomer mixture added to the diluted latex (C) additionally contains allyl methacrylate (1 g).

Example 5

Evaluation of the redispersibility

The pH of the latices obtained by carrying out Examples 1 to 4 is adjusted with a 10% solution of caustic soda. Films are prepared from these latices on a sheet of glass by coating the sheet with a No. 7 Meyer bar. The films are heated to 60($\pm$1)°C. for 2 minutes. After cooling to ambient temperature the redispersibility of the films is evaluated in the following manner:

Deionized water (0.25 ml) is placed on the surface of the film and the time required to obtain the discolouring is noted.

The colour of the dispersion obtained is also noted. This colour ranges from blue (complete redispersion) to white (partial redispersion).

The redispersed film is examined after 5 minutes and the percentage of the particles of particle size greater than 43 $\mu$m is estimated.

The films are classified as a function of their colour and of the quantity of unredispersed material.

By way of comparison, the redispersibility of the starting carboxylated styrene/butadiene latex (C) employed in Example 1 is also evaluated. The films of carboxylated styrene/butadiene latex (C) at pH 3, pH 6 and pH 9 do not react with water.

The results obtained are listed together in Table 1 (drying at 60° C.) and in Table 2 below (drying at 100° C.).

TABLE 1

Latex film heated for 2 minutes at 60° C.

| Latex employed | pH | Time for discolouring | Colour obtained | % particles of size greater than 43 $\mu$m |
|---|---|---|---|---|
| Starting latex (C.) of Example 1 | 4.0 | A, nil | A, — | 100% |
| Example 1 | 2.0 | A, nil | A, — | 100% |
| " | 6.0 | instantaneous | white | 70% |
| " | 9.0 | " | " | 60% |
| Example 2 | 2.0 | A, nil | A, — | 100% |
| " | 6.0 | instantaneous | cloudy | 70% |
| " | 9.0 | " | white | 70% |
| Example 3 | 2.0 | A, nil | A, — | 100% |
| " | 6.0 | instantaneous | white | 40% |
| " | 9.0 | " | cloudy | 70% |
| Example 4 | 2.0 | instantaneous | white | 40% |
| " | 6.0 | " | blue | <10% |
| " | 9.0 | " | white | 30% |

A: absence of redispersion

TABLE 2

Latex film heated for 2 minutes at 100° C.

| Latex employed | pH | Time for discolouring | Colour obtained | % particles of size greater than 43 $\mu$m |
|---|---|---|---|---|
| Starting latex (C.) of Example 1 | 4.0 | nil | — | 100 |
| 1 | 9.0 | instantaneous | white | 60% |
| 2 | 9.0 | instantaneous | white | 70% |
| 3 | 6.0 | instantaneous | white | 70% |
| 4 | 6.0 | instantaneous | blue | <10% |

Example 6

Preparation of a redispersible powder 10 kg of carboxylated styrene/butadiene latex (C) with a solids content of 50%, employed as raw material in Example 1 are introduced into a stainless steel reactor.

A monomer mixture is prepared, comprising 25.3 g of MMP (mercapto methyl propionate), 537.0 g of styrene, 183.0 g of methacrylic acid and 4.7 g of allyl methacrylate.

As soon as the reactor temperature has reached 30($\pm$1)°C., 12% of the above monomer mixture and 15 g of tert-butyl perbenzoate are added. Heating is continued and, when the temperature has stabilized at 80($\pm$1)°C., the remainder of the monomer mixture is added. In parallel, a solution of 7.5 g of ascorbic acid in deionized water is added over 3 hours and 45 minutes. The resulting latex has the following characteristics:

solids content: 51.0% viscosity: 194 mPa s pH: 4.9 particle size: 225 nanometers and (Coulter nanosizer) 350 ppm of the grains have a particle size greater than 45 $\mu$m.

The resulting latex is filtered through a 45-$\mu$m mesh sieve and is spray-dried with the accompanying addition of kaolin after the pH has been adjusted to 6.0.

A powder is obtained which flows well and exhibits good properties when employed in standard mortars.

Examples 7 and 8

Preparation of redispersible powders

The procedure of Example 6 is repeated exactly but with a shell size of 20% (Example 7) and of 30% (Example 8) by weight relative to the total weight of the latex particle (core+shell). After spray-drying a powder which flows well and is redispersible is also obtained.

Comparative Example 9

Separate preparation of the styrene/methacrylic acid copolymer of the shell

Deionized water (900 g) and 1 g of a surfactant (Nansa SB G2® at a concentration of 13.4%) are charged into a 2-liter reactor and are heated to 70° C.($\pm$1)°C. without stirring. A monomer preemulsion is prepared at the same time from 69.5 g of deionized water, 189.6 g of styrene, 81.3 g of methacrylic acid, 9.6 g of methylmercaptopropionate (MMP) and 1 g of surfactant (AD 33® at a concentration of 37%).

This preemulsion is added to the reactor at a temperature of 70(±1)°C. One ml of a solution of ferrous sulphate, 3.73 g of tert-butyl perbenzoate at a concentration of 75% and 2.5 g of Gobacite® (sodium formaldehyde sulphoxylate) dissolved in 15 g of deionized water are then added.

The same redox system is added again twice at the end of one hour and then of 2 hours of polymerization. The resulting latex is cooled and discharged.

100 g of carboxylated styrene/butadiene latex (C) employed in Examples 1 and 5 are mixed with 100 g of the latex as prepared above, neutralized, and the redispersibility of the dried film is measured. At pH 6 or after adjusting the pH between 8 and 12 with 10% NaOH a mediocre redispersibility is found.

Comparative Example 10

Separate preparation of styrene/methacrylic acid copolymer of the shell and simple mixing with the core copolymer The procedure of Example 9 is repeated exactly, except that the starting latex is prepared from a monomer mixture containing 20% by weight of methacrylic acid.

The product with a pH of 12.0 is neutralized by adding a mixture of 5.6 g of calcium hydroxide and a 50% solution of sodium hydroxide (12.0 g) dissolved in 50 g of deionized water.

The mixture is heated to 65°–70° C. for 2 hours. The polymer is insoluble at pH 12.0.

100 g of carboxylated styrene/butadiene latex (C) employed in Examples 1 and 5 are mixed with 100 g of the latex as prepared above, neutralized, and the redispersibility of the dried film is measured. At pH 6 or after adjusting the pH between 8 and 12 with 10% NaOH a mediocre redispersibility is found.

What is claimed:

1. A water-redispersible powder comprising particles of a film-forming polymer which is substantially water-insoluble and which is prepared by aqueous emulsion polymerization of monomers containing ethylenic unsaturation, said particles having a "core/shell" structure, said structure having a hydrophobic core comprising a polymer presenting remaining ethylenic unsaturations and exhibiting a glass transition temperature of between −30° and +25° C., and a hydrophilic shell comprising a polymer exhibiting a glass transition temperature higher than +55° C., wherein the shell is substantially insoluble in an alkaline medium and is bonded to the core by covalent bonds resulting from the reaction of an agent for grafting the shell onto the ethylenic unsaturations remaining in the core.

2. A water-redispersible powder according to claim 1, wherein the hydrophobic core has a glass transition temperature between −10° and +20° C. and the hydrophilic shell has a glass transition temperature higher than +90° C.

3. A water-redispersible powder according to claim 1, wherein the core is prepared by polymerization of a monomer mixture comprising from 99.9 to 92% of styrene, butadiene, $C_1$–$C_{12}$ alkyl acrylates or $C_1$–$C_{12}$ alkyl methacrylates and from 0.1 to 8% of at least one monomer selected from the group consisting of a carboxylic acid containing ethylenic unsaturation, an unsaturated carboxylic acid ester containing a hydroxyalkyl functional group and a monomer containing an amide functional group.

4. A water-redispersible powder according to claim 3, wherein the core is prepared by polymerization of a monomer mixture of styrene and butadiene.

5. A water-redispersible powder according to claim 1, wherein the shell is prepared by emulsion polymerization on the core particles of a monomer mixture comprising from 40 to 95% by weight of styrene, butadiene, $C_1$–$C_{12}$ alkyl acrylates or $C_1$–$C_{12}$ alkyl methacrylates, from 4.5 to 55% by weight of a monomer selected from the group consisting of a carboxylic acid containing ethylenic unsaturation, an unsaturated carboxylic acid ester containing a hydroxyalkyl functional group and a monomer containing an amide functional group and from 0.5 to 5% by weight of a grafting agent, wherein the grafting agent is a(meth)allyl ester of (meth)acrylic acid, a (meth)allyl ester of a mono- and diester of maleic acid, a (meth)allyl ester of a mono- and diester of fumaric and a (meth)allyl ester of a mono- and diester of itaconic acid, or an alkene derivative of an amide of acrylic and methacrylic acid.

6. A water-redispersible powder according to claim 5, wherein the shell is prepared by emulsion polymerization on the core particle in the presence of one or more organophilic initiators.

7. A water-redispersible powder according to claim 6, wherein the organophilic initiator is a peroxide or a perester.

8. A water-redispersible powder according to claim 7, wherein the organophilic initiator is cumene hydroperoxide, dicumyl peroxide, tert-butyl perneodecanoate, tert-butyl per-3,5,5-trimethylhexanoate, bis(3,5,5-trimethylhexanoyl) peroxide, dioctanoyl peroxide, dilauroyl peroxide or dibenzoyl peroxide.

9. A water-redispersible powder according to claim 1, further comprising per 100 parts by weight of film-forming polymer, from 0.5 to 40 parts of one or more inorganic fillers.

10. A water-redispersible powder according to claim 9, wherein said filler comprises from 2 to 20 parts of a powder having a particle size which is smaller than 10 $\mu$m.

11. A water-redispersible powder according to claim 9, comprising, per 100 parts by weight of film-forming polymer, from 0.5 to 30 of one or more saccharides.

12. A process for the preparation of a redispersible powder as defined in claim 1, comprising the steps of:

removing water from an aqueous emulsion comprising the said film-forming polymer which is substantially water-insoluble and which is prepared by polymerization in an emulsion whose pH is adjusted between 5 and 8 in order to obtain a dry residue, and, optionally, adding an inorganic filler and saccharide; and pulverizing the dry residue to a powder.

13. A process according to claim 12, wherein the powder is obtained by spray-drying.

14. A process according to claim 13, wherein all or part of the inorganic filler is added during the pulverizing step.

15. A Pseudolatex obtained by redispersion in water of a powder as defined in claim 1.

16. An additive to an hydraulic binder, an adhesive, a paper-coating composition or a paint comprising the pseudolatex as defined in claim 15.

17. An additive to an hydraulic binder, an adhesive, a paper-coating composition or a paint comprising the powder as defined in claim 1.

* * * * *